United States Patent
Paul et al.

(10) Patent No.: US 9,886,326 B2
(45) Date of Patent: Feb. 6, 2018

(54) THERMALLY-AWARE PROCESS SCHEDULING

(71) Applicant: Advanced Micro Devices, Inc., Sunnyvale, CA (US)

(72) Inventors: Indrani Paul, Round Rock, TX (US); Manish Arora, Sunnyvale, CA (US); William Lloyd Bircher, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 321 days.

(21) Appl. No.: 14/180,023

(22) Filed: Feb. 13, 2014

(65) Prior Publication Data

US 2015/0227391 A1 Aug. 13, 2015

(51) Int. Cl.
*G06F 1/32* (2006.01)
*G06F 9/50* (2006.01)
*G06F 1/20* (2006.01)

(52) U.S. Cl.
CPC ............ *G06F 9/5094* (2013.01); *G06F 1/206* (2013.01); *G06F 1/3206* (2013.01); *Y02B 60/142* (2013.01); *Y02B 60/144* (2013.01)

(58) Field of Classification Search
CPC .................................................... G06F 9/4893
See application file for complete search history.

(56) References Cited

U.S. PATENT DOCUMENTS

| | | | | |
|---|---|---|---|---|
| 2005/0120252 A1* | 6/2005 | Uwatoko | ................ | G06F 1/206 713/300 |
| 2006/0095913 A1* | 5/2006 | Bodas | ................... | G06F 9/5027 718/100 |
| 2006/0107262 A1* | 5/2006 | Bodas | ................... | G06F 9/5027 718/100 |
| 2006/0282689 A1* | 12/2006 | Tipley | ................... | G06F 1/3203 713/300 |
| 2007/0260415 A1* | 11/2007 | Aguilar, Jr. | ................ | G06F 8/45 702/117 |
| 2008/0022076 A1* | 1/2008 | Krieger | ................... | G06F 1/206 712/220 |
| 2008/0310099 A1* | 12/2008 | Monferrer | ............... | H01L 23/34 361/679.46 |
| 2009/0007120 A1* | 1/2009 | Fenger | ................... | G06F 9/4893 718/102 |
| 2009/0300385 A1* | 12/2009 | Archer | .................. | G06F 1/3203 713/320 |
| 2009/0307698 A1* | 12/2009 | Khatri | ................... | G06F 1/3203 718/102 |
| 2011/0016337 A1* | 1/2011 | Cepulis | ................. | G06F 9/4893 713/320 |
| 2011/0023039 A1* | 1/2011 | Memik | ................... | G06F 1/206 718/102 |

(Continued)

OTHER PUBLICATIONS

U.S. Appl. No. 14/016,063, filed Aug. 31, 2013, entitled "Stacked 3D Chip Incorporating One or More Layers of Thermally Capacitive Material".

*Primary Examiner* — Thomas Lee
*Assistant Examiner* — Gary Collins (57) ABSTRACT

A scheduler is presented that can adjust, responsive to a thermal condition at the processing device, a scheduling of process threads for compute units of the processing device so as to increase resource contentions between the process threads.

19 Claims, 7 Drawing Sheets

(56) References Cited

U.S. PATENT DOCUMENTS

| | | | | |
|---|---|---|---|---|
| 2012/0060170 | A1* | 3/2012 | Vajda | G06F 9/4893 718/104 |
| 2013/0305067 | A1* | 11/2013 | Lefurgy | G06F 9/4893 713/320 |
| 2013/0311811 | A1* | 11/2013 | Bose | G06F 9/50 713/340 |
| 2014/0317389 | A1* | 10/2014 | Wenisch | G06F 1/20 712/229 |

* cited by examiner

THERMALLY-AWARE PROCESS SCHEDULING

BACKGROUND

Field of the Disclosure

The present disclosure relates generally to processing devices and, more particularly, scheduling processes in processing devices.

Description of the Related Art

A processing device, such as a system-on-a-chip (SOC), often incorporates multiple compute units of a processing device onto a single substrate. A compute unit typically includes one or more processor cores that share resources such as floating-point unit, one or more caches, branch predictors, a physical layer interface to external memory, and other front-end logic. For example, an accelerated processing unit (APU) may use a single substrate to support and interconnect multiple compute units such as central processing units (CPUs) or graphics processing units (GPUs). Some processing devices may also stack multiple substrates on top of each other and interconnect them using through silicon vias (TSVs). For example, one or more substrates including memory elements such as dynamic random access memory (DRAM) may be stacked over a substrate including APU, which can read instructions or data from the dynamic random access memory (DRAM) via the physical layer interface, perform operations using the instructions or data, and then write the results back into the DRAM via the physical layer interface.

Operation of the components of the SOC generates heat, which raises the temperature of the SOC. The temperature at a particular location on the SOC depends on the thermal density at the location and the thermal sensitivity of the location. The thermal density indicates the amount of power dissipated per unit area or the amount of heat dissipation per unit area at a location on the SOC. The thermal sensitivity indicates how sensitive the temperature at a particular location is to changes in the thermal density in a region proximate the location. For example, a region with a higher thermal sensitivity may rise to a higher temperature than a region with a lower thermal sensitivity when the two regions are exposed to the same thermal density. The thermal sensitivity is typically larger in portions of the SOC that include a larger density of circuits because changes in the power dissipated in higher density circuits can lead to more rapid changes in the local temperature. The thermal sensitivity is also typically larger at the center of a substrate because circuits in the center of the substrate are not as close to external heat sinks and therefore do not dissipate heat as efficiently as circuits near the edge of the substrate that are closer to the external heat sinks. Stacking multiple substrates in a 3-dimensional configuration may also affect the thermal density and thermal sensitivity because heat can be efficiently conducted between the stacked substrates.

Conventional power management algorithms attempt to maintain the operating temperature of the SOC within a predetermined range using temperatures measured by one or more temperature sensors at different locations around the substrate. The power management algorithms can adjust the operating frequency or operating voltage of the SOC so that the measured temperature does not exceed a maximum temperature at which heat dissipation may damage the SOC. For example, a power management algorithm may increase the operating frequency of the SOC until the temperature measured by one or more temperature sensors approaches the maximum temperature. The power management algorithm may then maintain or decrease the operating frequency of the SOC to prevent the temperature from exceeding the maximum temperature.

The thermal density or the thermal sensitivity of a location on a substrate may depend on the workload or workloads being executed on the substrate. For example, the thermal densities of a pair of compute units may be relatively high if they are independently processing two high-power workloads because there is no resource contention between the workloads being processed on the different compute units and they are able to retire instructions at a high rate. The temperatures of the compute units may therefore increase while processing the high-power workloads due to the relatively high heat dissipation, potentially leading to thermal throttling of the workloads, e.g., by reducing the operating frequency or operating voltage.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-8 depict some embodiments of a processing device that can reduce the temperature of its compute units by deliberately introducing contention between process threads of different workloads for shared resources in the compute units. Resource contention may reduce the thermal density or thermal sensitivity of a compute unit, and therefore its temperature, by decreasing the instruction retirement rate or commit rate, increasing memory-related stalling, slowing the rate of processing branching instructions, or otherwise introduce effects that decrease the heat dissipated in the compute unit. For example, scheduling threads for two high-power workloads to the same compute unit may reduce the thermal density or thermal sensitivity of the compute unit (relative to scheduling the two high-power workloads to different compute units) because the two high-power workloads contend for the same shared resources in the compute unit and therefore are not able to retire instructions at as high a rate as two compute units independently processing the high-power workloads.

Scheduling workloads to create resource contention in one or more compute units may allow the processing device to handle larger workloads without exceeding the maximum operating temperature for the processing device. For example, the improved thermal headroom may allow the operating frequency of the processing device to be increased (e.g., boosted) for longer periods of workload sprinting, which may offset the performance penalty associated with increased resource contention to provide a net performance benefit. This approach may be particularly effective when one or more of the workloads consumes a lot of power but has a low sensitivity to resource contention. Some embodiments of the thermally-aware scheduling techniques may also alleviate thermal hotspots and improve reliability, leakage power, or chip lifetimes, which are adversely impacted by excessive temperatures.

Figure 1:
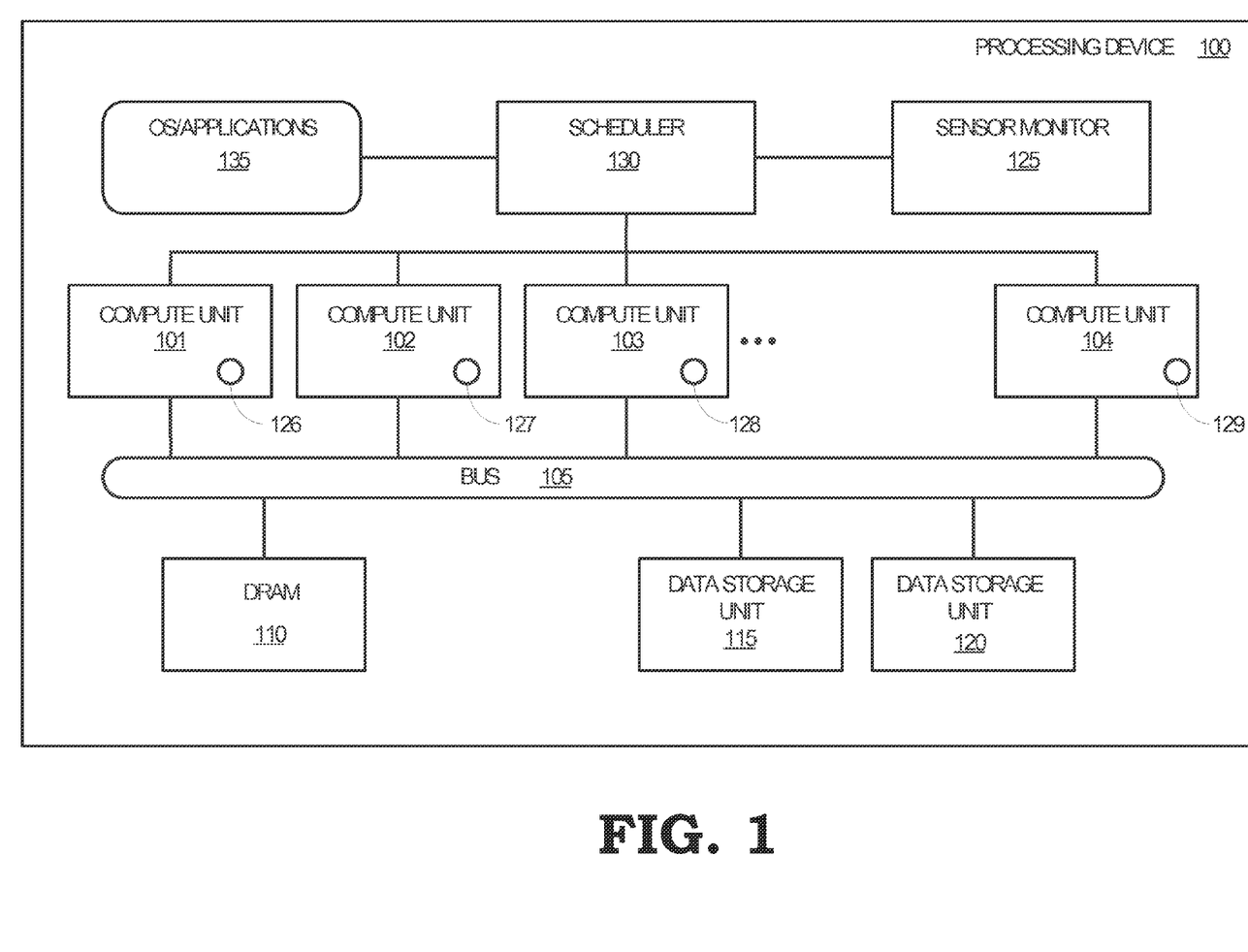
FIG. 1 is a block diagram of a processing device according to some embodiments.

FIG. 1 is a block diagram of a processing device 100 according to some embodiments. The processing device 100 includes a plurality of compute units 101, 102, 103, 104 (collectively referred to as the "compute units 101-104") such as CPUs or GPUs. For example, the processing device 100 may be a system-on-a-chip (SOC) such as an accelerated processing unit (APU) that is formed on a substrate. Each of the compute units 101-104 includes a plurality of processor cores that can concurrently process different instructions. The compute units 101-104 also include one or more resources that are shared by the processor cores, such as caches, arithmetic logic units, floating-point units, branch prediction logic, memory or bus interfaces, and the like.

The processing device 100 includes memory elements such as a dynamic random access memory (DRAM) 110 and data storage units 115, 120 for storing instructions or data that may be used by the compute units 101-104 or other entities in the processing device 100. The compute units 101-104 may communicate with the DRAM 110, the data storage units 115, 120, or other entities in the processing device 100 using a bus 105. For example, the compute units 101-104 may include a physical layer interface or bus interface for asserting signals onto the bus 105 and receiving signals from the bus that are addressed to the corresponding compute unit 101-104. Some embodiments of the processing device may also include one or more bridges such as a northbridge or a southbridge for facilitating communication between entities in the processing device 100.

A sensor monitor 125 may be used to collect results of measurements performed by sensors 126, 127, 128, 129 (collectively referred to as the "sensors 126-129") distributed around the processing device 100. Exemplary sensors may include thermal diodes, transistors, and the like that generate a current that represents the temperature of the sensor. Some embodiments of the processing device 100 include one or more sensors 126-129 in corresponding compute units 101-104. Other sensors (not shown in the interest of clarity) may be deployed at other locations around the processing device 100. The sensors 126-129 may be used to measure temperatures or power dissipation rates in the corresponding compute units 101-104. The sensor monitor 125 may then use the measurement results to generate a thermal density map of the processing device 100, as discussed in detail herein. Some embodiments of the sensor monitor 125 may also perform other operations such as detecting temperature or thermal density peaks using the thermal density map.

A scheduler 130 is used to schedule process threads associated with workloads being performed by the processing device 100. Some embodiments of the processing device 100 may perform multiple workloads concurrently and the scheduler 130 can be used to schedule process threads associated with the different workloads so that the different process threads are performed concurrently on one or more of the compute units 101-104. As discussed herein, some process threads or workloads can generate thermal conditions such as temperature or thermal density peaks when executed on the compute units 101-104, e.g., due to a high instruction retirement rate or instruction commit rate when a single process thread is being executed by a single compute unit 101-104. The scheduler 130 may therefore schedule process threads to the compute units 101-104 in response to detecting a thermal condition in the processing device 100, such as peaks in temperature or thermal density indicated in the thermal density maps generated by the sensor monitor 125 using measurements performed by the sensors 126-129. The scheduler 130 may also collect one or more metrics that indicate resource contention between the process threads executing on the compute units 101-104 and use these measurements to schedule the process threads to increase or decrease contention between the process threads for shared resources of the compute units 101-104. Exemplary metrics of resource contention include instructions per cycle (IPC), retirement rates, commit rates, cache misses, branch mispredictions, and the like.

Some embodiments of the scheduler 130 may also schedule process threads based on a model of the thermal sensitivity of the processing device 100, e.g., as a function of the local temperature, power dissipation, duration of a processing mode, or resource contention. For example, a thermal map of the temperature of the processing device 100 may be used to identify thermal conditions such as temperature peaks that can be reduced by appropriate scheduling of the process threads. The scheduler 130 may also schedule process threads based on information provided by an operating system (OS) or one or more applications 135 that are generating the workloads in the processing device 100. Exemplary information provided by the OS/applications 135 may include information indicating relative numbers integer operations, floating-point operations, or memory operations in the process threads associated with the different workloads. The OS/applications 135 may also provide information to the scheduler 130 indicating priorities assigned to the threads, thread criticality, and the like.

Figure 2:
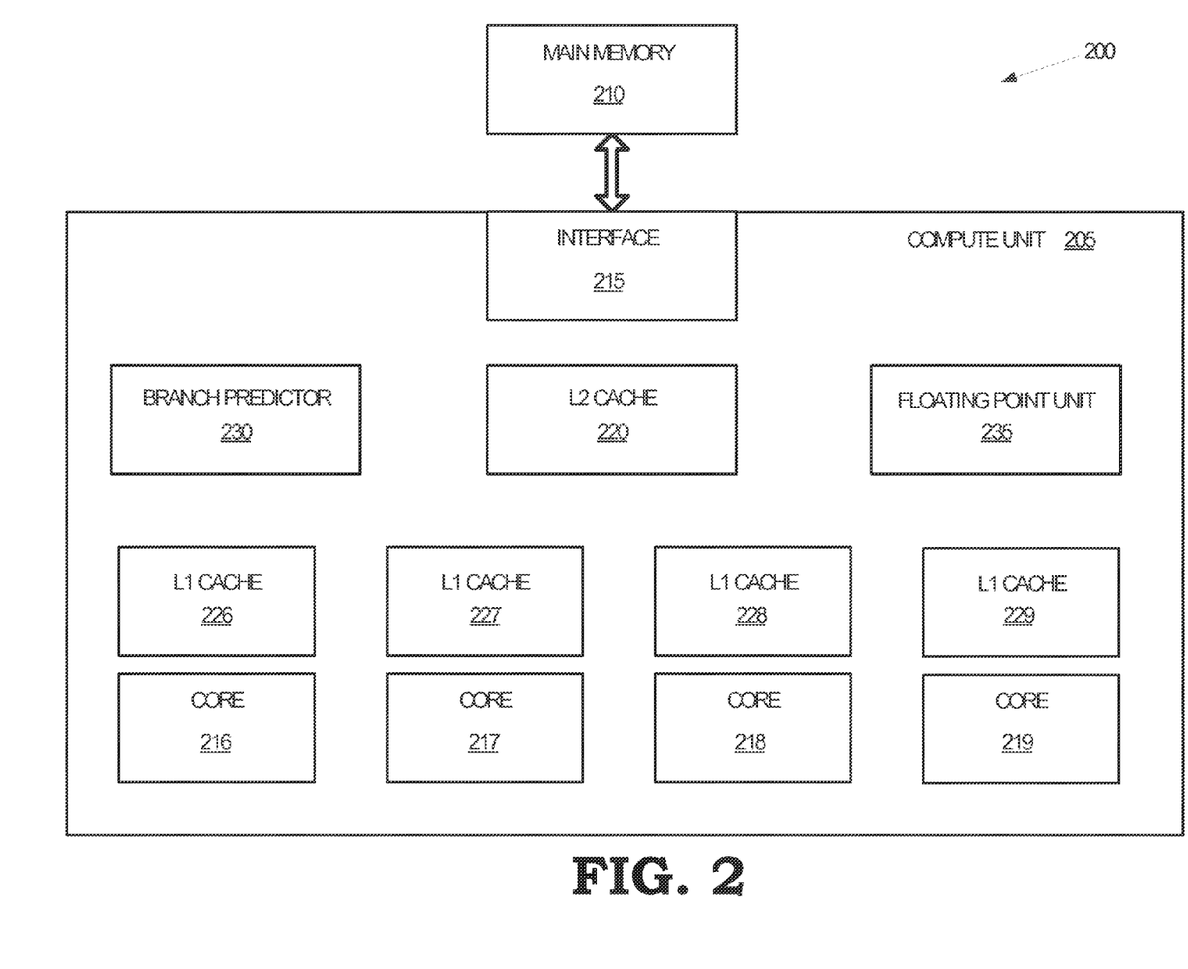
FIG. 2 is a block diagram of a processing device that includes a compute unit that may be used as one or more of the compute units shown in FIG. 1 according to some embodiments.

FIG. 2 is a block diagram of a processing device 200 that includes a compute unit 205 that represents one or more of the compute units 101-104 shown in FIG. 1 according to some embodiments. For example, the compute unit 205 may be a CPU that is configured to access instructions or data that are stored in a main memory 210 via a physical layer interface 215. The compute unit 205 includes four processor cores 216, 217, 218, 219 (collectively referred to as the "processor cores 216-219") that may be used to execute the instructions or manipulate the data. Some embodiments of the compute units 205 may include more or fewer processor cores. Some embodiments of the processor cores 216-219 may be configured to support hyperthreading so that each processor core 216-219 is associated with more than one virtual core that can be addressed separately for scheduling different process threads to the different virtual cores.

The compute unit 205 implements a hierarchical (or multilevel) cache system that is used to speed access to the instructions or data by storing selected instructions or data in the caches. The cache system includes a level 2 (L2) cache 220 for storing copies of instructions or data that are stored in the main memory 210. Persons of ordinary skill in the art having benefit of the present disclosure should appreciate that embodiments of the main memory 210 or the L2 cache 220 can be implemented using any associativity including 2-way associativity, 4-way associativity, 8-way associativity, 16-way associativity, direct mapping, fay associative caches, and the like. Relative to the main memory 210, the L2 cache 220 may be implemented using faster memory elements. The L2 cache 220 may also be deployed logically or physically closer to the processor cores 216-219 (relative to the main memory 210) so that information may be exchanged between the processor cores 216-219 and the L2 cache 220 more rapidly or with less latency.

The illustrated cache system also includes L1 caches 226, 227, 228, 229 (collectively referred to as the "L1 caches 226-229") for storing copies of instructions or data that are stored in the main memory 210 or the L2 cache 220. Each of the L1 caches 226-229 is associated with a corresponding one of the processor cores 216-219. The L1 caches 226-229 may be implemented in the corresponding processor core 226-229 or the L1 caches 226-229 may be implemented outside the corresponding processor cores 216-219. Relative to the L2 cache 220, the L1 caches 226-229 may be implemented using faster memory elements so that information stored in the lines of the L1caches 226-229 can be retrieved quickly by the corresponding processor cores 216-219. The L1 caches 226-229 may also be deployed logically or physically closer to the processor cores 216-219 (relative to the main memory 210 and the L2 cache 220) so that information may be exchanged between the processor cores 216-219 and the L1 caches 226-229 more rapidly or with less latency (relative to communication with the main memory 210 and the L2 cache 220). Some embodiments of the L1 caches 226-229 are separated into level 1 (L1) caches for storing instructions and data, which may be referred to as the L1-I cache and the L1-D cache.

The L2 cache 220 is shared by the processor cores 216-219 and the L1 caches 226-229. Thus, process threads that are being executed concurrently by more than one of processing cores 216-219 may contend for the shared resources of the L2 cache 220. For example, if the processing cores 216 and 217 are executing different process threads that require data or instructions from memory, the processing cores 216 and 217 first check their corresponding L1 caches 226 and 227 to see if the required data or instructions are available. The requests may be directed to the L2 cache 220 if the requests miss in the L1 caches 226 and 227 because the requested lines are not available in the L1 caches 226 and 227, potentially leading to resource contention that may cause one of the requests to the L2 cache 220 to be delayed, e.g. while the other request is being processed.

Some embodiments of the compute unit 205 include other resources that may be shared by the processing cores 216-219 or the L1 caches 226-229. For example, the compute unit 205 includes a branch prediction unit 230 that is used to predict which way a branch instruction proceeds after a conditional statement is evaluated. Contention for the resources of the branch prediction unit 230 may arise when more than one processing thread executes a branch instruction or is speculatively executing instructions following the branch instruction prior to evaluating the conditional statement. For another example, the compute unit 205 includes a floating-point unit 235 that performs operations involving floating-point numbers such as addition, subtraction, multiplication, division, and the like. Contention for the resources of the floating-point unit 235 may arise when more than one processing thread needs to evaluate a floating-point expression. The interface 215 may also be a shared resource and contention may arise when more than one processing core 2116-219 or L1 cache 226-229 attempts to read or write information from the main memory 210. Other resources of the compute unit 205 may also be shared and therefore give rise to resource contention.

Figure 3:
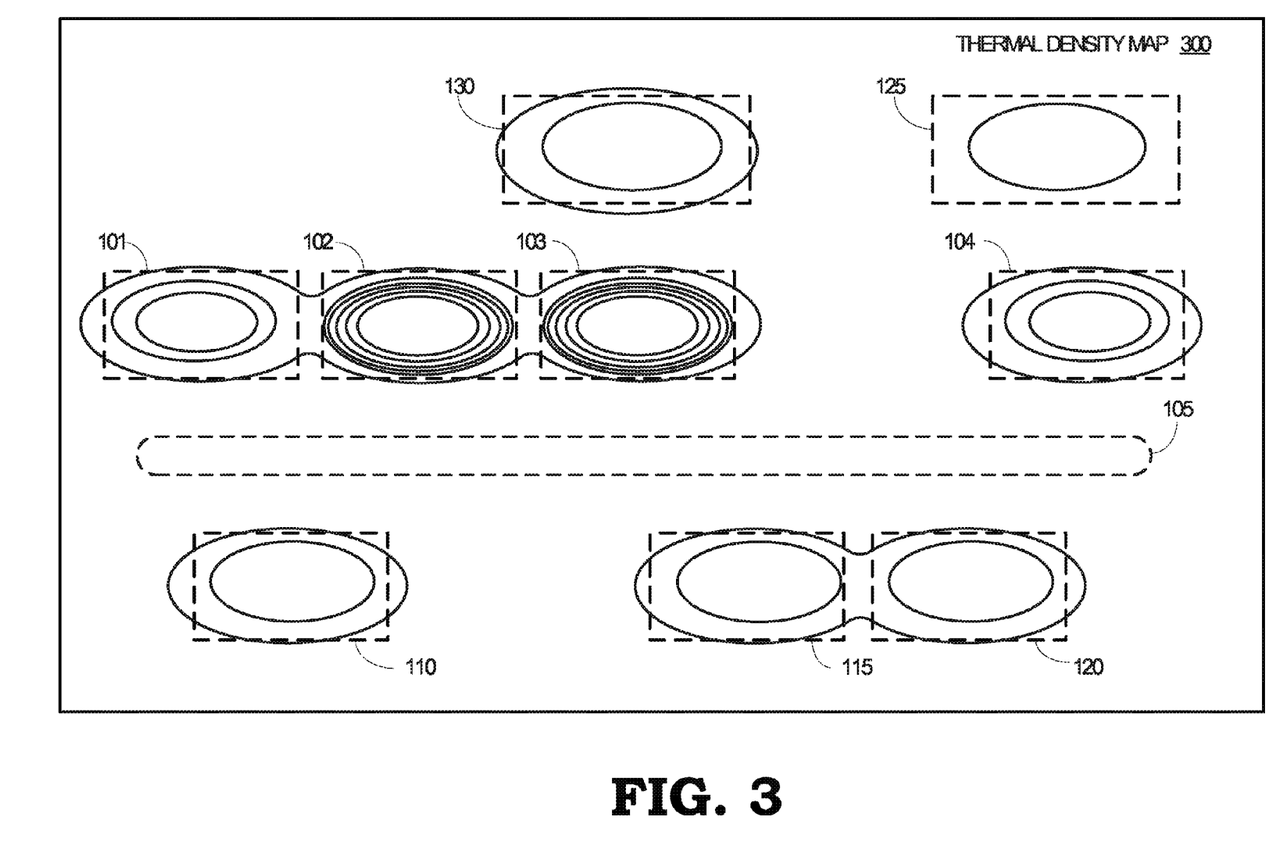
FIG. 3 is a contour plot of a thermal density map for a processing device such as the processing device shown in FIG. 1 according to some embodiments.

FIG. 3 is a contour plot of an example thermal density map 300 for a processing device such as the processing device 100 shown in FIG. 1 according to some embodiments. Locations of the compute units 101-104, the bus 105, the DRAM 110, the data storage devices 115 and 120, the sensor monitor 125, and the scheduler 130 are indicated by dashed lines to facilitate comparison with the processing device 100 shown in FIG. 1. Some embodiments of the thermal density map 300 may be generated by a sensor monitor such as the sensor monitor 125 shown in FIG. 1 using measurements performed by sensors such as the sensors 126-129 shown in FIG. 1. The thermal density map 300 (or information derived therefrom) may be provided to a scheduler such as the scheduler 130 shown in FIG. 1 for scheduling process threads to compute units 101-104.

In the context of this example thermal density map 300, each of the compute units 102 and 103 are independently processing a single process thread. Thus, there is no resource contention between the process threads executing on the compute units 102 and 103. The scheduler 130 may be aware of the low resource contention by monitoring one or more metrics such as instructions per count, instruction retirement rates, instruction commit rate, cache misses, branch mispredictions, and the like. For example, the instruction retirement rates for the compute units 102 and 103 may be relatively high (e.g., higher than a threshold) because of the low resource contention.

The contours of the thermal density map 300 indicate one or more thermal conditions such as the presence of thermal density peaks associated with both of the compute units 102 and 103. The thermal density peaks may be represented as temperature peaks. For example, each contour may indicate a difference of 0.5° C. and so the compute units 102 and 103 may be at a temperature that is approximately 2-3° C. higher than the temperature of the compute units 1101 and 104. As discussed herein, the thermal density peaks may at least in part because by the absence of resource contention for the threads that are processed by the compute units 102 and 103. The scheduler 130 shown in FIG. 1 may therefore use information in the thermal density map 300, such as the locations or amplitudes of the thermal density peaks, to schedule multiple process threads to one or more of the compute units 102 and 103 to increase resource contention and decrease the amplitudes of the thermal density peaks.

Figure 4:
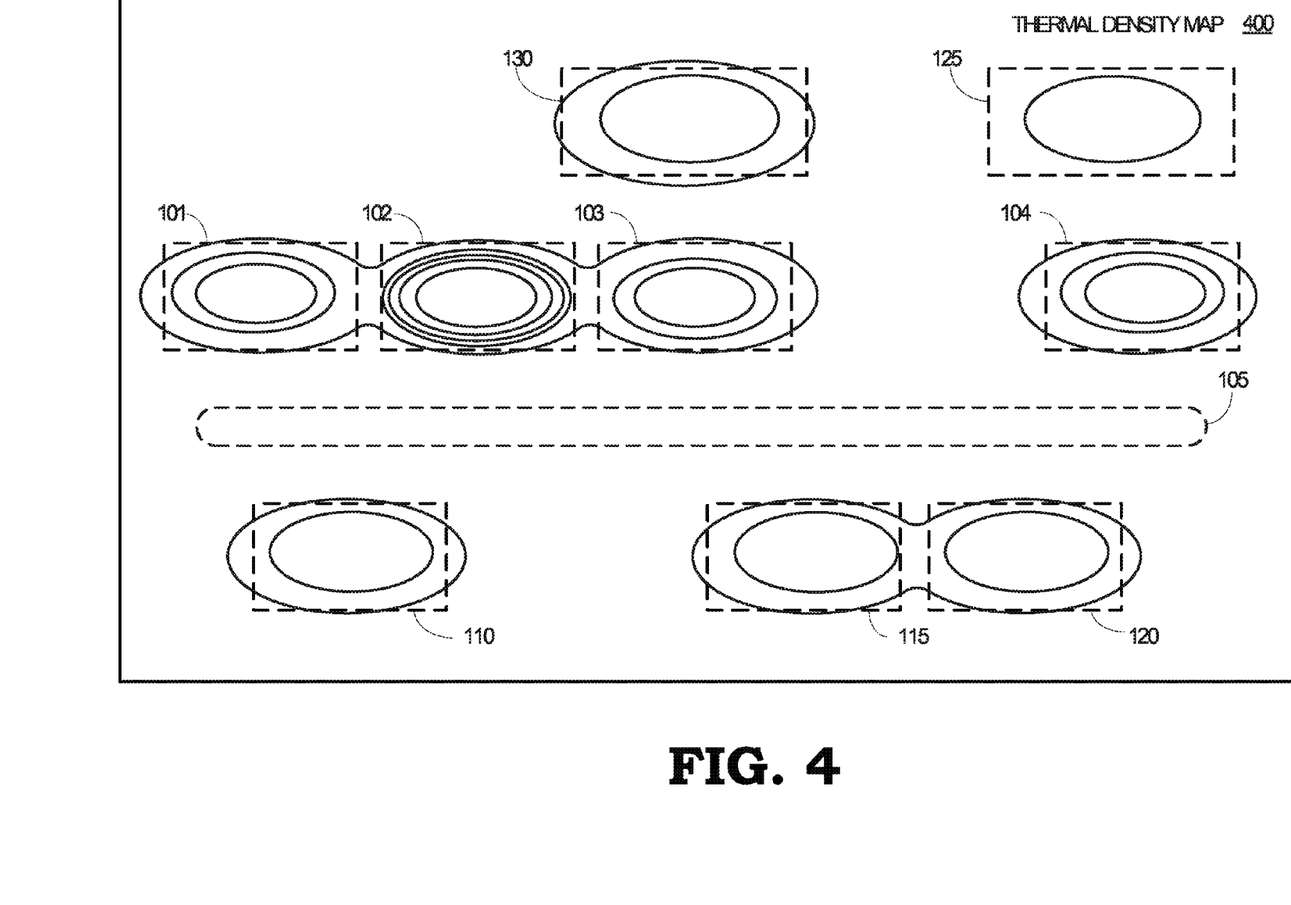
FIG. 4 is a contour plot of a thermal density map for a processing device such as the processing device shown in FIG. 1 according to some embodiments.

FIG. 4 is a contour plot of another example thermal density map 400 for a processing device such as the processing device 100 shown in FIG. 1 according to some embodiments. The thermal density map 400 differs from the thermal density map 300 shown in FIG. 3 because, for the example context of the thermal density map 400, a scheduler such as the scheduler 130 shown in FIG. 1 has scheduled the two process threads that were previously being performed by the compute units 102 and 103 so that they are being concurrently performed by the compute unit 102. Scheduling the process threads for concurrent execution on the compute unit 102 increases contention for the shared resources of the compute unit 102 such as the interface 215, the L2 cache 220, the branch prediction unit 230, or the floating-point unit 235 shown in FIG. 2.

Resource contention stows down the processing of the multiple process threads, e.g., by reducing the instructions per cycle, the instruction commit rate, or the instruction retirement rate and/or by increasing the number of cache misses or branch mispredictions. The amount of heat dissipated in the compute unit 102 may therefore be decreased, which reduces the amplitude of the thermal density peaks associated with the compute unit 102. Some embodiments of the scheduler 130 may also introduce resource contention by scheduling process threads from other compute units 101-104 to the compute unit 102, scheduling new process threads to the compute unit 102, or consolidating some or all of the process threads being performed by one or more of compute units 101-104 onto another one of the compute units 101-104.

Figure 5:
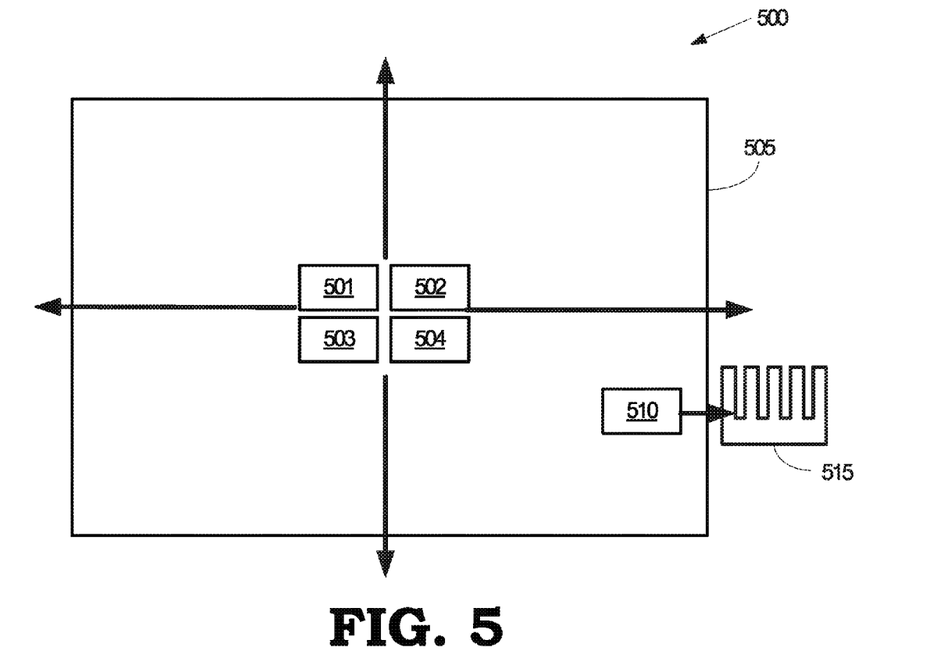
FIG. 5 is a block diagram of a portion of a processing device according to some embodiments.

FIG. 5 is a block diagram of a simplified representation of a floorplan portion of a processing device 500 according to some embodiments. As discussed herein, the thermal sensitivity of different locations on the processing device 500 may depend on factors such as the density of circuits at the location, the relative proximity of the location to one or more edges of a substrate 505 on which the processing device 500 is formed, or the proximity of the location to heat sinks or other regions of enhanced heat dissipation. The processing device 500 includes compute units 501, 502, 503, 504 (collectively referred to as the "compute units 501-504") that are formed at a central location on the substrate 505. Consequently, heat generated by the compute units 501-504 diffuses through a relatively long distance before escaping from the substrate 505, as indicated by the relatively long arrows, which may increase the thermal sensitivity of the region near the compute units 501-504. Moreover, the compute units 501-504 are relatively densely grouped, which may also increase the thermal sensitivity of this region. The thermal density and/or temperature of the region near the compute units 501-504 may therefore increase relatively rapidly in response to heat generated by the compute units 501-504.

The processing device 500 also includes a compute unit 510 that is formed relatively close to the right-hand edge of the substrate 505 shown FIG. 5. The thermal sensitivity of the region proximate the compute unit 510 may therefore be lower than the thermal sensitivity of the region near the compute units 501-504 because heat generated by the compute unit 510 does not have to travel as far to escape from the substrate 505, as indicated by the relatively short arrow. The compute unit 510 is also relatively near to a heat sink 515, which may be designed to efficiently dissipate heat. For example, the heat sink 515 may be formed of metal or a phase change material to enhance the thermal capacity of the heat sink 515.

A scheduler such as the scheduler 130 shown in FIG. 1 may use a model of the thermal sensitivity of the substrate 505 to schedule process threads to one or more of the compute units 501-504 or 510. For example, the scheduler may schedule a single process thread that is sensitive to the latency caused by resource contention to the compute unit 510 because the compute unit 510 can efficiently dissipate the heat generated by a single process thread being performed without significant resource contention. For another example, the scheduler may co-locate multiple process threads on individual compute units 501-504 because the thermal sensitivity in this region is high and introducing resource contention may lower the thermal density or temperature in this region more rapidly than co-location of multiple processes on the compute unit 510, which has a lower thermal sensitivity.

Figure 6:
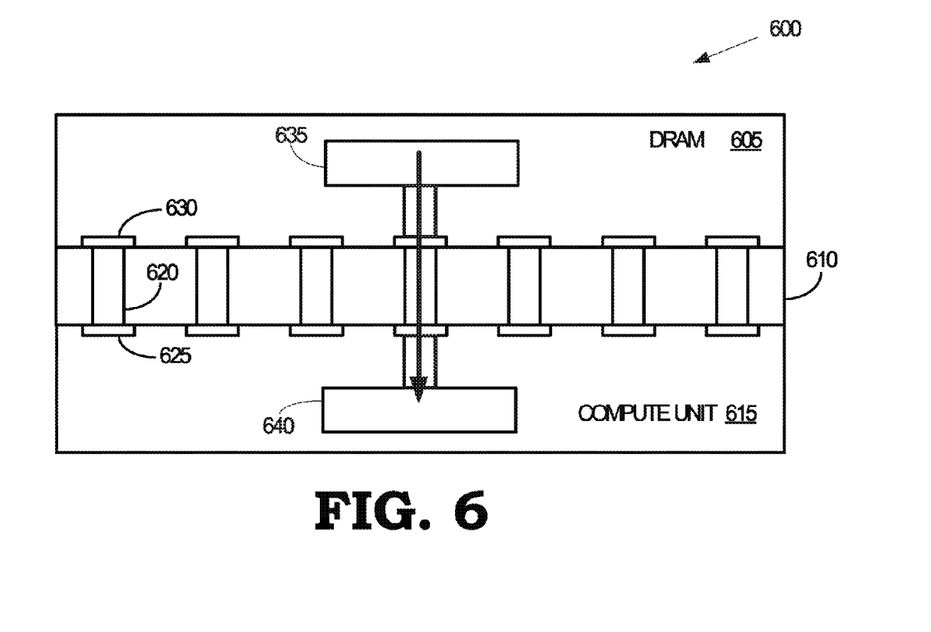
FIG. 6 is a cross-sectional view of a three-dimensional stacked die according to some embodiments.

FIG. 6 is a cross-sectional view of a three-dimensional stacked die 600 according to some embodiments. The die 600 includes DRAM 605 that is stacked over a silicon layer 610, which is in turn stacked over a compute unit 615. The DRAM 605 and the compute unit 615 are interconnected by one or more through silicon vias 620 that are formed of a conductive material and can be used to convey signaling between a conductive contact 625 in the compute unit 615 and a conductive contact 630 in the DRAM 605 so that these entities can communicate with each other. The through silicon vias 620 may efficiently transfer heat between the DRAM 605 and the compute unit 615. For example, heat generated in a memory element 635 in the DRAM 605 may be efficiently conducted to a processor core 640 in the compute unit 615, as indicated by the arrow. The thermal sensitivity of the compute unit 615 may therefore be determined in part by properties of the DRAM 605 or the through silicon vias 620. A scheduler such as the scheduler 130 shown in FIG. 1 may therefore take into account the effects of stacked devices on the thermal sensitivity of a device such as the compute unit 615, e.g., using an appropriate model of the thermal sensitivity of the compute unit 615.

Figure 7:
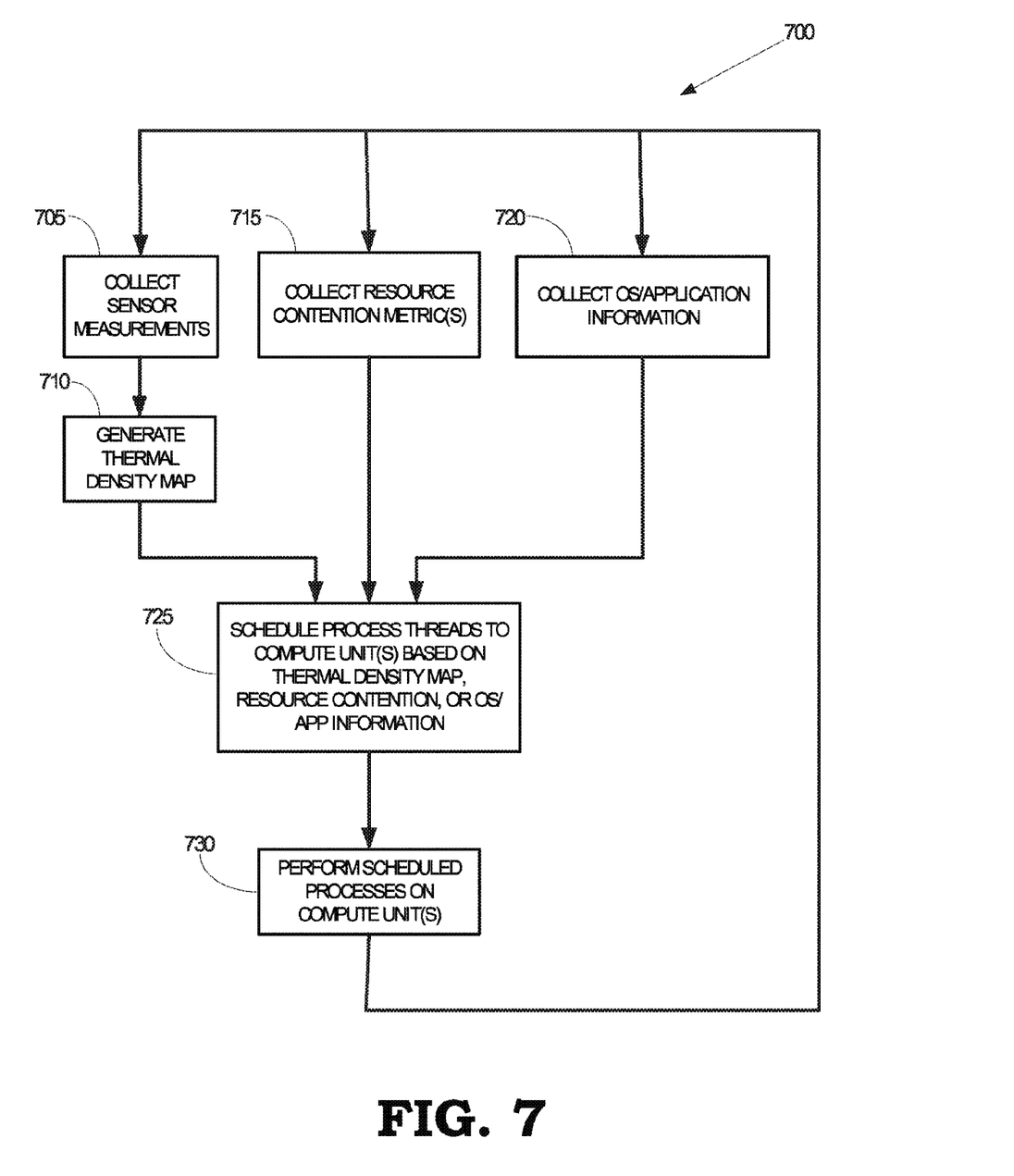
FIG. 7 is a flow diagram of a method for scheduling processes to compute units based on thermal density and resource contention according to some embodiments.

FIG. 7 is a flow diagram of a method 700 for scheduling process threads to compute units in a processing device in response to thermal conditions in the processing device according to some embodiments. The method 700 may be implemented in a scheduler such as the scheduler 130 shown in FIG. 1. At block 705, the scheduler may collect measurements from sensors such as the sensors 126-129 shown in FIG. 1. The measurements may include information indicating the temperature, thermal density, power dissipation, or other measurement indicating the thermal properties or conditions proximate to the sensor that performs the measurement. The information may be collected directly from the sensors or from a sensor monitor such as the sensor monitor 125 shown in FIG. 1. At block 710, a thermal density map may be generated based on the selected measurements. The thermal density map may be generated by the scheduler or by the sensor monitor, which may then provide the thermal density map to the scheduler. However, the scheduler may use other representations of the thermal properties of the compute units or other entities in a processing device in some embodiments.

At block 715, the scheduler may collect resource contention metrics from compute units such as the compute units 101-104 shown in FIG. 1. The resource contention metrics may include information that indicates instructions per cycle (IPC) performed by the compute unit over a time interval, retirement rates for instructions executed in the compute unit, commit rates for instructions executed in the compute unit, cache misses, branch mispredictions, and the like. At block 720, the scheduler may collect information provided by the operating system (OS) or one or more applications. The information may be associated with the process threads and may include a type of application that generated the process thread, numbers of integer operations or floating-point operations in the process thread, relative numbers of integer operations and floating-point operations in the process thread, numbers or relative numbers of different types of memory instructions in the process thread, a quality-of-service associated with an application, priorities of process threads, criticality of process threads, and the like. The operations performed at blocks 705, 710, 715, 720 may be performed sequentially, simultaneously, concurrently, or in any other order. Moreover, the operations performed at block 705, 710, 715, 720 may be performed at predetermined time intervals or in response to signals such as a request from the scheduler or sensor monitor.

At block 725, the scheduler may schedule process threads to one or more compute units based on thermal conditions such as thermal density peaks indicated in the thermal density map. Process threads may also be scheduled based on one or more resource contention metrics or the OS/applications information. As discussed herein, the process threads may be scheduled to increase or reduce contention for shared resources in the compute units as part of the thermal management of the processing device. For example, the thermal density map generated at block 710 may indicate the presence of one or more thermal conditions such as peaks in the thermal density map. Peaks may be defined based on the actual value of the thermal density, e.g., when the thermal density exceeds a threshold, or based on the relative value of the thermal density, e.g., when the thermal density is more than a predetermined multiple of an average thermal density over the thermal density map. Some embodiments of the scheduler may define the thermal density map or peaks in terms of other parameters such as temperatures or power dissipation rates. The scheduler may then assess the degree of resource contention in different compute units in the processing device using the metrics collected at block 715. Multiple process threads may then be co-located on compute units that are associated with peaks in the thermal density map but have relatively low degrees of resource contention, e.g., as compared to other compute units. As discussed herein, a thermal sensitivity model may also be used to schedule the process threads.

Some embodiments of the scheduler may also schedule process threads to the compute units based on the information collected from the OS/applications at block 720. For example, the scheduler may co-locate process threads that have relatively high proportions of floating-point operations to the same compute unit to induce higher degrees of contention for the shared floating-point unit resource. For another example, the scheduler may co-locate process threads that have relatively high numbers of read or write instructions to induce higher degrees of contention for the shared cache or memory resources.

At block 730, the compute units may perform the scheduled processes. In some embodiments, the operating point of one or more of the compute units may be adjusted prior to performing the scheduled process threads. For example, the operating frequency or operating voltage of one or more of the compute units may be increased or boosted to increase the overall throughput during a period of workload sprinting. Scheduling the process threads based on the thermal density map and resource contention metrics may allow the period of workload sprinting to be increased relative to processing devices that implement conventional scheduling and thermal management techniques. Measurements, metrics, or OS/applications information may be collected concurrently with performing the schedule processes or after performing all or a subset of the schedule processes, this information may then be fed back to blocks 705, 715, 720 and the method 700 may continue to iterate to provide a control loop that controls the scheduling of process threads to the compute units.

In some embodiments, the apparatus and techniques described above are implemented in a system comprising one or more integrated circuit (IC) devices (also referred to as integrated circuit packages or microchips), such as the processing device described above with reference to FIGS. 1-6. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a non-transitory computer readable storage medium accessible to the computing system. Likewise, the code representative of one or more phases of the design or fabrication of an IC device may be stored in and accessed from the same computer readable storage medium or a different computer readable storage medium.

A non-transitory computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 8:
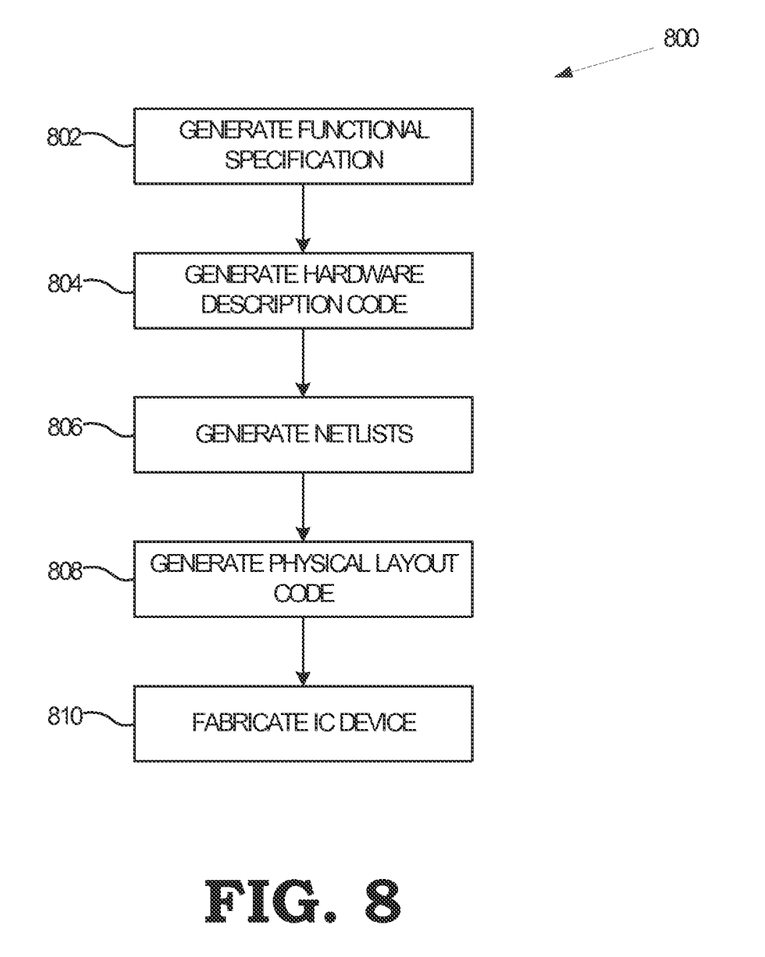
FIG. 8 is a flow diagram illustrating a method for designing and fabricating an integrated circuit device implementing at least a portion of a component of a processing device in accordance with some embodiments.

FIG. 8 is a flow diagram illustrating an example method 800 for the design and fabrication of an IC device implementing one or more aspects in accordance with some embodiments. As noted above, the code generated for each of the following processes is stored or otherwise embodied in non-transitory computer readable storage media for access and use by the corresponding design tool or fabrication tool.

At block 802 a functional specification for the IC device is generated. The functional specification (often referred to as a micro architecture specification (MAS)) may be represented by any of a variety of programming languages or modeling languages, including C, C++, SystemC, Simulink, or MATLAB.

At block 804, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 806 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 808, one or more EDA tools use the netlists produced at block 806 to generate code representing the physical layout of the circuitry of the IC device. This process can include, for example, a placement tool using the nettists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 810, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, whole or part, the operation of the tools of the manufacturing facility or the manufacturing operations performed therein.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   detecting a thermal condition at a first compute unit of a processing device while the first compute unit is executing a first process thread concurrently with a second compute unit executing a second process thread; and
   generating resource contention between the first process thread and the second process thread by scheduling the second process thread to the first compute unit for concurrent execution with the first process thread on the first compute unit in response to detecting the thermal condition.

2. The method of claim 1, wherein the scheduling comprises scheduling the second process thread to the first compute unit in response to identifying at least one peak in a thermal density map associated with the first compute unit.

3. The method of claim 2, further comprising modifying at least one of an operating frequency or an operating voltage associated with the first compute unit in response to scheduling the first process thread and the second process thread for concurrent execution on the first compute unit.

4. The method of claim 1, wherein scheduling the second process thread to the first compute unit is based on a thermal sensitivity model that indicates a rate of temperature change in response to changes in thermal density at locations around the processing device.

5. The method of claim 4, wherein scheduling the second process thread to the first compute unit is based on a thermal sensitivity model that indicates the rate of temperature change as a function of at least one of local temperature, power dissipation, duration of a processing mode, or resource contention at the first compute unit.

6. The method of claim 1, wherein scheduling the second process thread to the first compute unit is based on indications of at least one of a quality-of-service associated with the first and second process threads, priorities of the first and second process threads, criticality of the first and second process threads, or types of tasks performed by the first and second process threads.

7. The method of claim 1, further comprising generating a thermal density map using a plurality of measurements performed by sensors distributed at different locations around the processing device, and wherein the thermal condition is detected using the thermal density map.

8. The method of claim 1, further comprising: monitoring the resource contention at the first compute unit, and
whereby, in response to detecting low resource contention at the first compute unit, scheduling the second process thread to the first compute unit increases resource contention at the first compute unit.

9. A processing device, comprising:
first and second compute units;
a sensor monitor to detect a thermal condition at the first compute unit while the first compute unit is executing a first process thread concurrently with the second compute unit executing a second process thread; and
a scheduler to generate resource contention between the first process thread and the second process thread by scheduling the second process thread to the first compute unit for concurrent execution with the first process thread on the first compute unit in response to detecting the thermal condition.

10. The processing device of claim 9, wherein the scheduler is to schedule the second process thread to the first compute unit in response to identifying at least one peak in a thermal density map associated with the first compute unit.

11. The processing device of claim 10, wherein:
the first compute unit comprises at least one shared resource.

12. The processing device of claim 10, wherein at least one of an operating frequency or an operating voltage associated with the first compute unit are modifiable in response to the first process thread and the second process thread being scheduled to the first compute unit.

13. The processing device of claim 9, wherein the scheduler is to schedule the second process thread to the first compute unit based on a thermal sensitivity model that indicates a rate of temperature change in response to changes in thermal density at locations around the processing device.

14. The processing device of claim 13, wherein the scheduler is to schedule the second process thread to the first compute unit based on a thermal sensitivity model that indicates the rate of temperature change as a function of at least one of local temperature, power dissipation, duration of a processing mode, resource contention, indications of at least one of a quality-of-service associated with the first or second process threads, priorities of the first or second process threads, criticality of the first or second process threads, or types of tasks performed by the first or second process threads.

15. The processing device of claim 9, comprising:
a plurality of sensors distributed at different locations around the processing device, wherein the sensor monitor is configured to generate a thermal density map using a plurality of measurements performed by the plurality of sensors.

16. The processing device of claim 9, wherein the scheduler is configured to:
monitor the resource contention at the first compute unit and,
in response to detecting low resource contention at the first compute unit, schedule the second process thread to the first compute unit such that resource contention at the first compute unit is increased.

17. A non-transitory computer readable storage medium encoded with instructions that, when executed by a processor-based system, cause the processor-based system to:
detect a thermal condition at a first compute unit of a processing device while the first compute unit is executing a first process thread concurrently with a second compute unit executing a second process thread; and
generate resource contention between the first process thread and the second process thread by scheduling the second process thread to the first compute unit for concurrent execution with the first process thread on the first compute unit in response to detecting the thermal condition.

18. The non-transitory computer readable storage medium of claim 17, encoded with instructions that, when executed by a processor-based system, cause the processor-based system to schedule the second process thread to the first compute unit in response to identifying at least one peak a thermal density map associated with the first compute unit.

19. The non-transitory computer readable storage medium of claim 17, encoded with instructions that, when executed by a processor-based system, cause the processor-based system to generate a thermal density map using a plurality of measurements performed by sensors distributed at different locations around the processor-based system, and wherein the thermal condition is detected using the thermal density map.

* * * * *

UNITED STATES PATENT AND TRADEMARK OFFICE
CERTIFICATE OF CORRECTION

PATENT NO. : 9,886,326 B2
APPLICATION NO. : 14/180023
DATED : February 6, 2018
INVENTOR(S) : Indrani Paul et al.

Page 1 of 1

It is certified that error appears in the above-identified patent and that said Letters Patent is hereby corrected as shown below:

In the Claims

Column 13, Line 42, Claim 12 delete "compute unit are modifiable" and substitute --compute unit is modifiable--

Column 14, Line 42, Claim 18 delete "one peak a" and substitute --one peak of a--

Signed and Sealed this
Tenth Day of December, 2019

Andrei Iancu
*Director of the United States Patent and Trademark Office*